(12) United States Patent
Christ, Jr.

(10) Patent No.: US 6,532,147 B1
(45) Date of Patent: Mar. 11, 2003

(54) FLEXIBLE MONITOR/DISPLAY ON MOBILE DEVICE

(75) Inventor: Arthur R. Christ, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,960

(22) Filed: Sep. 24, 1999

(51) Int. Cl.[7] .................................................. G06F 1/16
(52) U.S. Cl. ...................... 361/683; 361/681; 312/7.2; 349/58; 248/922; 248/917
(58) Field of Search ................. 361/681, 682, 361/686, 683; 248/917–924; 349/57, 58; 345/156, 173, 905; 312/223.1–223.3, 7.2

(56) References Cited

U.S. PATENT DOCUMENTS

| | | | |
|---|---|---|---|
| 4,718,740 A | * | 1/1988 | Cox ........................ 312/223.1 |
| 4,814,759 A | * | 3/1989 | Gombrich et al. ........... 312/7.2 |
| 4,834,329 A | * | 5/1989 | Delapp ....................... 248/923 |
| 5,333,116 A | | 7/1994 | Hawkins et al. .......... 364/708.1 |
| 5,345,362 A | | 9/1994 | Winkler ...................... 361/681 |
| 5,494,447 A | | 2/1996 | Zaidan ......................... 439/31 |
| 5,644,469 A | | 7/1997 | Shioya et al. ............... 361/681 |
| 5,668,570 A | * | 9/1997 | Ditzik ......................... 248/923 |
| 5,768,096 A | * | 6/1998 | Williams et al. ............ 361/681 |
| 5,805,412 A | | 9/1998 | Yanagisawa et al. ....... 361/686 |
| 5,828,015 A | | 10/1998 | Coulon .......................... 200/5 |
| 5,991,150 A | * | 11/1999 | Chiu et al. .................. 361/681 |
| 6,031,714 A | * | 2/2000 | Ma ............................. 361/681 |
| 6,064,373 A | * | 5/2000 | Ditzik ........................ 361/681 |
| 6,094,180 A | * | 7/2000 | Mead, Jr. et al. .......... 361/681 |
| 6,099,329 A | * | 8/2000 | Goff et al. .................. 439/131 |
| 6,134,103 A | * | 10/2000 | Ghanma ..................... 361/681 |
| 6,229,693 B1 | * | 5/2001 | Karidis et al. ............. 361/681 |
| 6,233,138 B1 | * | 5/2001 | Osgood ..................... 361/681 |

FOREIGN PATENT DOCUMENTS

| | | | |
|---|---|---|---|
| EP | 0335472 A1 | * | 4/1989 |
| JP | 4-15680 | * | 1/1992 |
| JP | 5-173668 | * | 7/1993 |

* cited by examiner

Primary Examiner—Darren Schuberg
Assistant Examiner—Lisa Lea-Edmonds
(74) Attorney, Agent, or Firm—Moser, Patterson & Sheridan, L.L.P.

(57) ABSTRACT

A portable computer is provided which has a display screen mounted to a base by one or more flexible hinges, such as scissors type hinges or telescoping hinges, to provide flexibility of the operable positions of the display screen in relation to the base. The display screen is rotatably connected to the hinges to enable the display screen to be positioned above the base or on the base in either a face-up or face-down position. Electrical connections are provided between the base and the display screen through the scissors hinges.

6 Claims, 6 Drawing Sheets

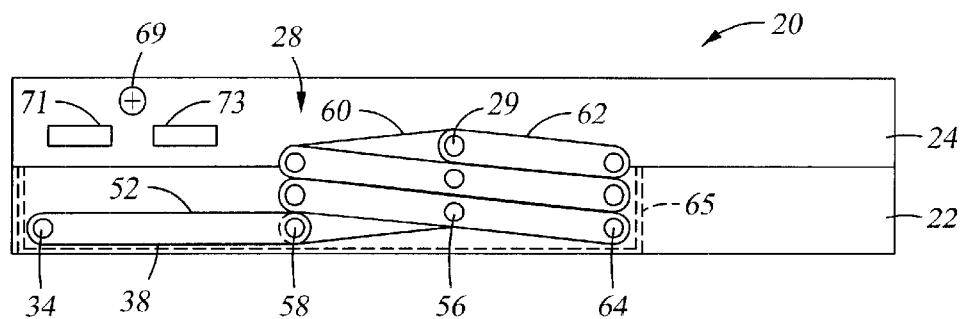
Fig. 2
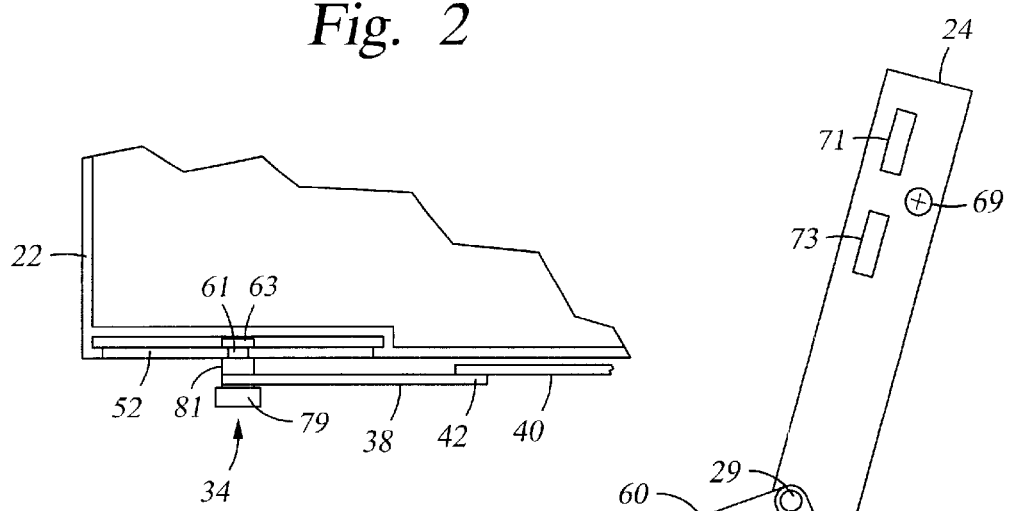
Fig. 3b
Fig. 3a
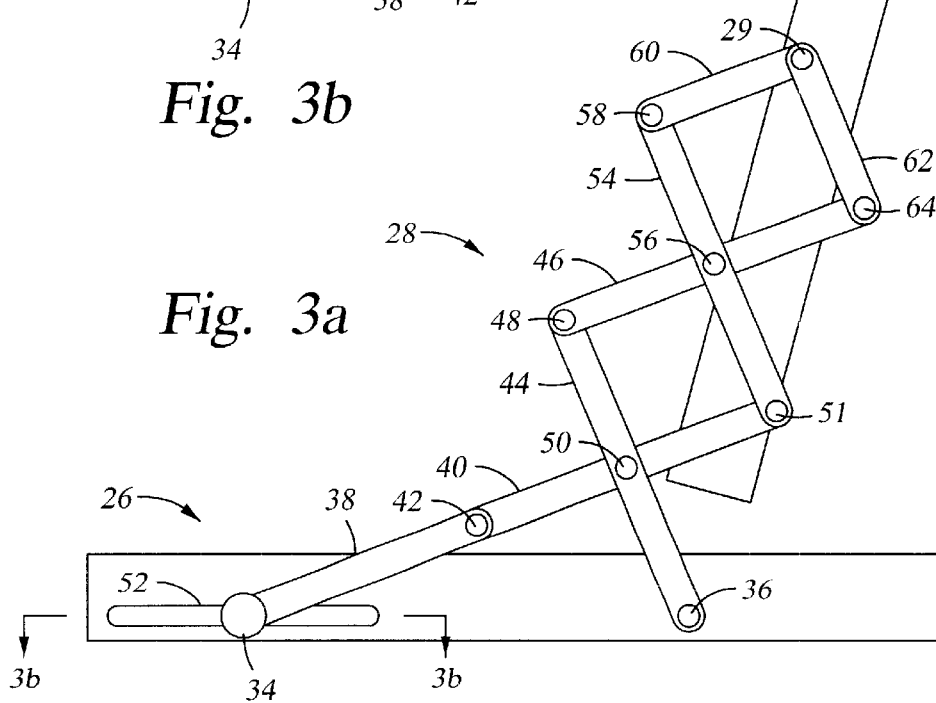

FLEXIBLE MONITOR/DISPLAY ON MOBILE DEVICE

BACKGROUND OF THE INVENTION

1. Field of the Invention

The present invention generally relates to portable computers and other electronic devices. More specifically, the invention relates to portable computers having an adjustable monitor or display.

2. Background of the Related Art

Substantial technological advancements in the field of electronics over the past several years has enabled computer equipment manufacturers to provide powerful, fully featured computers that are compact and portable. Portable computers have become extremely popular and are valuable tools for many individuals and businesses. Portable computers have developed from early luggable suit case designs, through smaller laptop designs, and now, with the aid of smaller packaging, to notebook, subnotebook and personal digital assistants (PDAs), such as pen computers.

In most notebook computers, a keyboard compartment is hinged to a display screen compartment in a manner in which the display screen compartment folds down on the keyboard compartment, as shown by the computer 100 in FIG. 1. A hinge is provided along one side of both the display screen 125 and the keyboard 115. This design is typically referred to as a clam shell type enclosure. The screen is movable between a closed position representing an angle of zero degrees (0°) with the base 110 and a fully opened position representing an angle of about one hundred eighty degrees (180°) with the base. The clam shell design computer is typically operated when the display screen is positioned at an angle of about ninety (90°) or more with respect to the base. As a result, sufficient room to fully open the computer and position the display screen at an angle of about 90° or more with respect to the base is needed.

Unfortunately, the space available to operate a portable computer on an aircraft or in other tight quarters makes it difficult to operate the portable computer because the display screen cannot be positioned properly for viewing. For example, the space available to operate the portable computer may equal the width of the computer. As a result, the screen cannot be opened to an angle greater than ninety degrees (90°) which may be required to provide visible access to the screen. As a result, the computer must be awkwardly positioned to view the screen and the position may result in an uncomfortable hand and wrist position.

One attempt to enhance the adjustability of the display screen above the keyboard is to use a hinge assembly connected to one side of the display screen and the keyboard which provides linear movement along each component. However, this hinge mechanism requires a complicated sleeve assembly to be disposed in each of the display screen and the keyboard which compromises the longevity, expense and reliability of the device. In addition, the freedom of movement of the display screen is limited by the sliding sleeve mechanisms disposed in each of the two components.

Further, a display screen is typically connected to the base so that the screen is hidden when the clam shell is closed, i.e., the screen faces the upper surface of the base. Consequently, the computer cannot be operated in a manner that allows a user to view the display in a closed position. New advanced programs, such as mapping programs as well as PDAs, cannot be operated when the display screen is in a closed face down position on the keyboard compartment. As a result, portable computers cannot be used to advantage with such applications.

One attempt to overcome the limitations of the clam shell design closable in only a face down position uses two centrally mounted connecting members disposed between the display screen and the keyboard which are rotatably connected on both ends thereof In this way, the display screen can be closed in either a face up or a face down position. However, this design does not provide any flexibility to the positioning of the display screen above the keyboard during normal use.

Therefore, there is a need for a portable computer which provides flexibility in display screen positioning over a keyboard and which can be closed in a display screen up position for use in a compact mode.

SUMMARY OF THE INVENTION

The present invention generally provides a portable computer such as a laptop computer, notebook computer, subnotebook computer and/or personal digital assistant (PDA) having a flexible hinge mechanism to connect a display screen to a base having a keyboard disposed thereon. In one embodiment, two scissors type hinges are mounted on either side of the display screen and the base to secure the display screen to the base. The display screen is rotatably connected to the scissors type hinges at a pivot point on either side thereof to enable rotation of the display screen about the pivot to position the display screen in either a face up or face down position. The scissors type hinges may include one or more links to provide both vertical and lateral movement of the display screen above the base. The scissors type hinges are connected at two points on either side of the base. In one aspect, one connection point of the scissors type hinge to the base is slidable laterally across at least a portion of the width of the base to enable retraction of the hinges to position the display screen on the base.

In another embodiment, one or more telescoping hinges connect the display to screen to the base. The telescoping hinges are rotatably connected between the base and the display screen to enable elevation and rotation of the display screen above the base. The display screen is positionable in a conventional position over the back of the base or in a non-conventional position above the base. Further, the display screen is positionable in a face-up or face-down position when the computer is closed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a perspective side view of a portable computer in a closed, display down position.

FIG. 3a is a perspective side view of a portable computer in an opened position.

FIG. 3b is a top cross-sectional view of a base showing one embodiment of a pivot connection.

DETAILED DESCRIPTION OF THE PREFERRED EMBODIMENT

Figure 1:
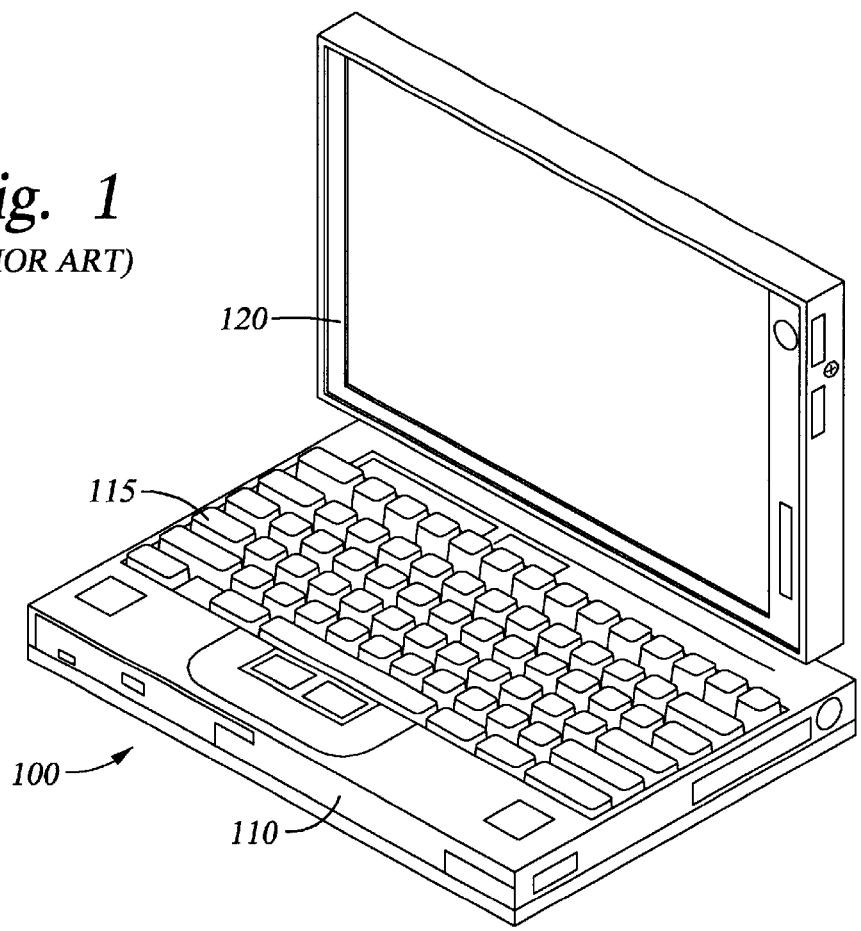
FIG. 1 is a perspective view of a conventional clam shell enclosure design for a portable computer.

The present invention generally provides a portable computer having a display screen movably mounted to a base by one or more flexible hinges. Preferably, a pair of scissors type hinges or telescoping hinges are mounted on opposing sides of the base and the display screen to secure the display screen to the base. The scissors type hinges or telescoping hinges enable the display screen to extend vertically and laterally above the base. In addition, the display screen is rotatable about the connections with the hinges to allow angular adjustment to the display screen. The invention will be described below in reference to a portable computer, namely a ThinkPad® available from International Business Machines Corporation of Armonk, N.Y.

FIG. 2 is a perspective side view of one embodiment of a portable computer of the invention. The portable computer 20 generally includes a base 22 and a display screen 24 mounted to the base 22. The base 22 preferably includes a central processing unit and other electronic components and a data entry member, such as a keyboard 26 (shown in FIG. 3a). The display screen 24 is mounted to the base 22 via one or more scissors type hinges 28 or other adjustable hinge mechanisms which allow multiple degrees of freedom in the movement of the display screen 24 relative to the base 22. Preferably, two scissors type hinge mechanisms are disposed on opposing sides of the base 22 and the display screen 24 and connected therebetween to provide a flexible and sturdy connection between the base 22 and the display screen 24.

FIG. 3a is a side perspective view of the portable computer 20 shown in FIG. 2 having scissors type hinges 28 mounted centrally between the front and back of both the base 22 and the display screen 24. The display screen 24 is connected to one end of the scissors hinge at a single point 29 on either side of the display screen 24 to enable rotation of the display screen 24 about an axis x. Preferably, the display screen 24 is rotatable about the x-axis through about three hundred sixty degrees (360°) to position the display screen 24 at any desired angle relative to the base 22, including a face up position over the base 22, a face down position over the base 22 and any position therebetween.

The scissors type hinges 28 are each connected to the base 22 at two locations on each side of the base 22 to adequately support the display screen 24 when it is in an extended position above the base 22. The scissors hinges 28 include one or more links to assist in opening and closing the display screen 24 and to provide adequate extension of the display screen 24 above the base 22. The hinges allow the display screen 24 to be supported above the base 22 in multiple locations between the front and the back of the base 22. Herein, this position of the display screen 24 is referred to as the lateral positioning of the display screen 24 above the base 22.

In the embodiment shown, three links are provided for each of the scissors hinges 28. Herein, a link refers to two or more struts pivotally connected to one another and to one of another link, the display screen 24 or the base 22. The number of links can be determined based on the desired functionality of the computer and the types of forces encountered during use. A first lower link is made of three members 38, 40, 44, two of which (38,44) are pivotally connected to the base 22 at pivot points 34, 36. Member 38 is pivotally connected on one end to the base 22 at pivot point 34 and on the other end to a second member 40 at a second pivot point 42. Member 40 is connected to member 44 at its center at pivot point 50. Member 44 is connected at one end to the base 22 and at its other end to a fourth member 46 at pivot 48.

Pivot 34 is slidably disposed in a slot 52 formed in the side of the base 22. The pivot 34 can be fixed along the length of the slot 52 by a frictional connection to allow the member 38 to be fixed along the path, thereby "locking" the display screen 24 at a desired position. For example, pivot 34 may include a pivot pin 61 disposed in the slot 52 as shown in FIG. 3b. The pivot pin 61 could mount link 38 between a head 63 of the pivot pin 61 and a spacer 81 disposed outside of slot 52. A lock nut 79 disposed on a threaded end of the pin 61 facilitates locking the link 38 and, hence, the display screen 24, in the desired position. The lock nut 79 can be manually tightened on proper placement of the pivot 61 along the slot 52 by rotating the nut 79 until the head 63 and the spacer 81 securing the link 38 frictionally locked along the wall of the slot 52.

Figure 4:
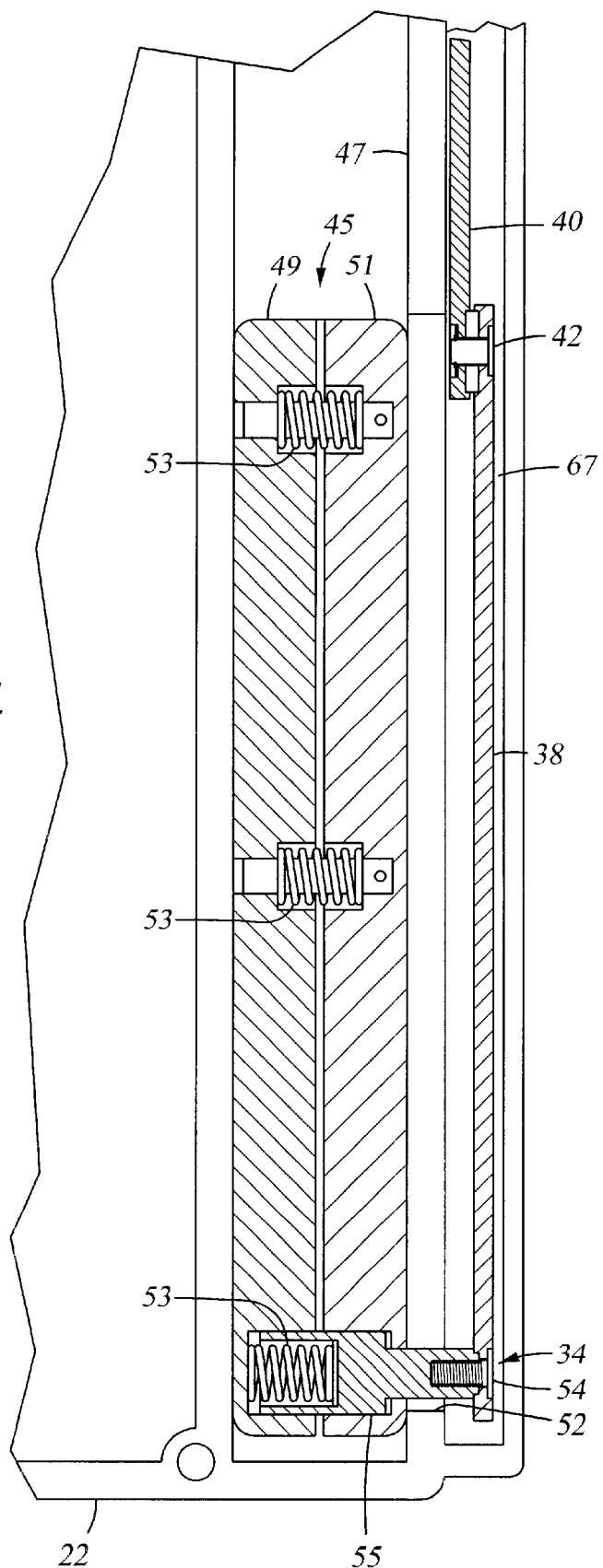
FIG. 4 is a top cross-section view of a base showing a channel in which a pivot is housed.

Another locking assembly for the link 38 is shown in FIG. 4 which is a top cross-sectional view of the base 22 taken along section lines 3b (shown in FIG. 3a) and showing a connection of pivot 34 to the base 22. A spring biased pivot support 45 is disposed in a channel 47 formed in the sides of the base 22. The pivot support 45 includes two sliding members 49, 51 which are biased apart from one another by one or more springs 53 (three shown) in channel 47. The pivot 34 includes a shaft 55 housed at least partially between the sliding members 49, 51 and extending outwardly through slot 52 to mount link 38 by pivot pin 57. The shaft 55 is biased between the sliding members by a spring 53. The frictional forces between the sliding members 49, 51 and the walls of the channel 47 provide holding forces sufficient to allow positioning of the pivot 34 anywhere along the slot 52. The movement of the member 38 will be described in operation in more detail below.

A second link is made of members 46 and 54. Members 46 and 54 are connected to one another at their center at pivot 56. Member 46 is connected at its distal end to member 62 at pivot 64. Member 54 is connected at its distal end to member 60 at pivot point 58. Members 60 and 62 make up the third link and are each connected at their distal ends to the display screen 24 at pivot point 29.

Each of the pivots 29, 34, 36, 42 48, 51, 58, and 64 are frictional pivots which can support the display screen 24 in desired positions over the base 22. In operation, the display screen 24 can be collapsed down on the base 22 by folding the scissors type hinges 28 down into a closed position as shown on FIG. 2. Referring to FIG. 3a, the display screen 24 has been raised above the base 22 and the pivot 34 has been moved along the slot 52 to a position about midway down the slot. The link 38 is slidably connected via the pivot 34 to enable the display screen 24 to be positioned over the back of the base 22 as shown in FIG. 4. The display screen 24 is movable about pivots 34, 50, 56 and 29 to position the display screen 24 both laterally and vertically above the base 22. The links are movable laterally about member 38 and pivot 42. As member 38 is rotated about pivot 34 and moved along the slot 52, the links can be aligned vertically and laterally to extend the display screen 24 over the base 22.

The scissors type hinges 28 can be mounted in a slot 67 (shown in FIG. 4) formed in the side of the base 22 along the upper surface thereof to protect or guard the links of the hinges and/or to prevent harm to an operator. The links collapse into the slot 67 for storage or when only partially extended. Alternatively, the base 22 may include a side cover 65, as shown in phantom in FIG. 2, which can be connected to the sides of the base 22 to at least partially cover the slot, the pivot 34 and the links to prevent harm to the operator.

Figure 6:
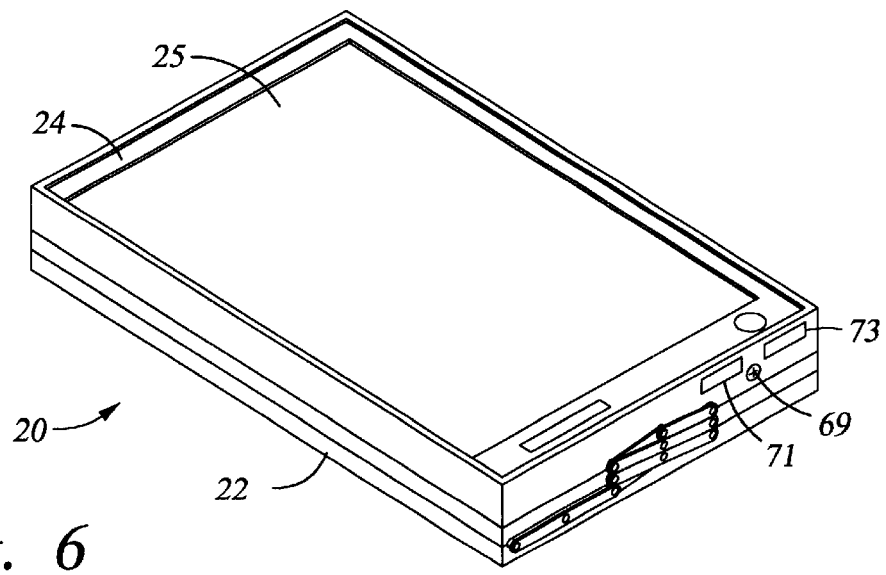
FIG. 6 is a perspective side view of a portable computer in a closed, display up position.

The scissors type hinge connections are adapted to enable the display screen 24 to be lifted into an operating position over the base 22, as shown in FIG. 3a, or otherwise laterally or vertically displaced over the base 22. In addition, the scissors type hinges 28 allow the display screen 24 to close down onto the base 22 in either a face-up position as shown in FIG. 6 or a face-down position as shown in FIG. 2. As a result, the viewing area 25 of the display screen 24 can be viewed when the computer 20 is in its compact portable position with the display screen 24 closed down onto the base 22 in the face-up position shown in FIG. 6. A conventional track-point device 69 (shown in FIG. 2) can be mounted on the side of the display screen 24 (or display screen frame) so that an operator desiring to scroll or select an item with the mouse would not be required to lift up the display screen 24 to access the keyboard 26. Click buttons 71, 73 are also mounted on the side of the display screen 24 to function similar to conventional mouse buttons. Alternatively, the track point device 69 and the buttons 71, 73 could be disposed on the face of the display screen 24 or in any other location which would allow the devices to be operated when the display screen 24 is in a face-up closed position.

Figure 5:
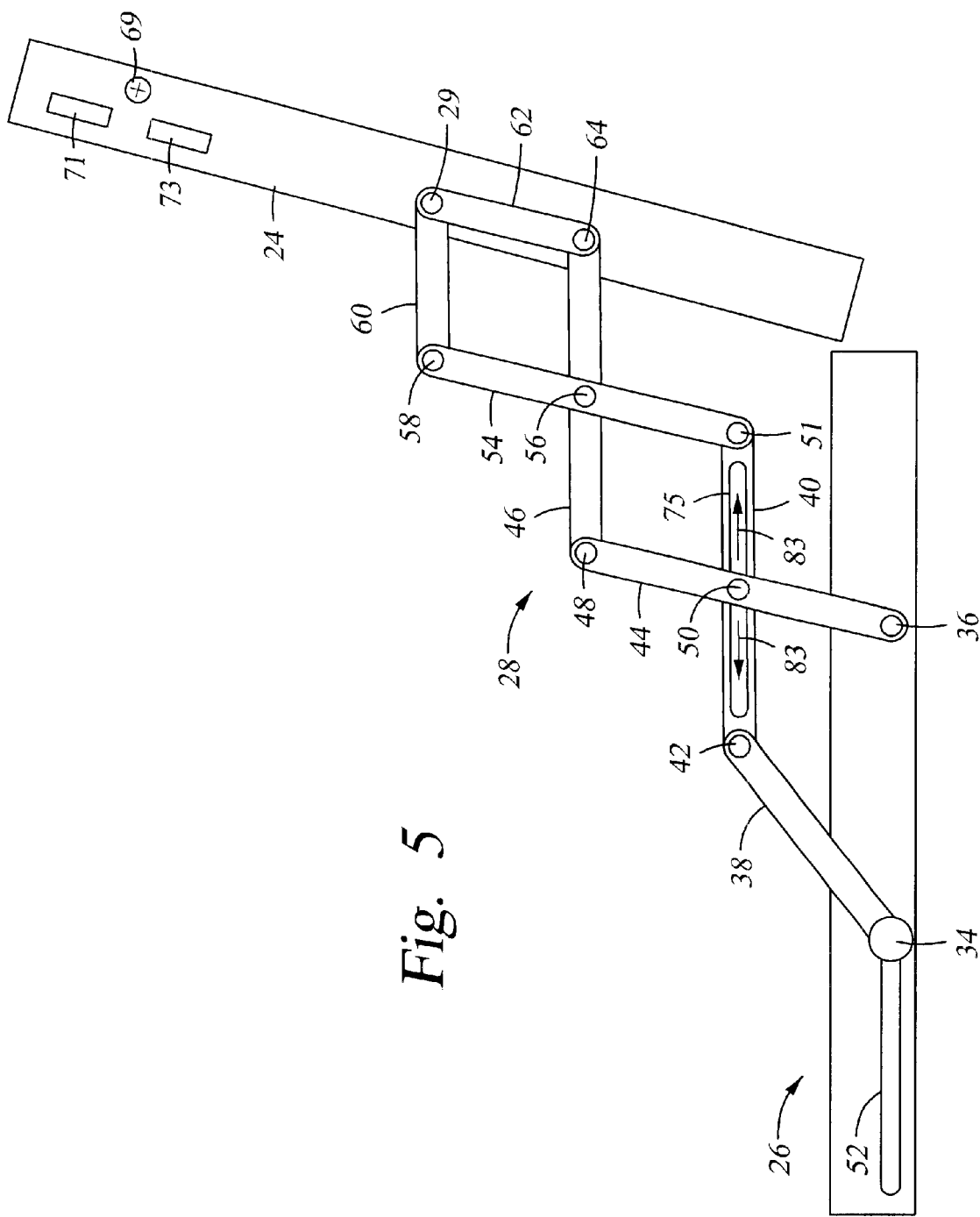
FIG. 5 is a perspective side view of a portable computer in an opened position with the display screen over the back of the base.

In another embodiment, pivot 50 can be adapted to move along the length of member 40, as shown by arrows 83 in FIG. 5. The members 42 and 50 can define a slot or channel 75 in which pivots 42 and 51 can travel. Still further, pivot 36 may also be slidably connected to the base 22 in a second slot to provide additional flexibility to the display screen 24 above the base 22.

The connection of the scissors type hinge 28 to the display screen 24 is preferably adapted to deliver the required power input to the display screen 24 during use and provide the data connection necessary to display the appropriate information. One type of connection can include an RCA jack mounted or otherwise disposed in one or both sides of the display screen 24. The electrical wires can be disposed within the hinges 28 or, alternatively, can be provided external to the hinges 28. Other types of electrical connections between the base 22 and the display screen 24 are possible and are within the scope of the invention.

During operation, the display screen 24 can be positioned towards the back of the base 22 at an angle slightly greater than ninety degrees (90°) as shown in FIG. 5. Additionally, the display screen 24 can be positioned over the base 22 as shown in FIG. 3a by positioning the pivot 34 along the slot 52 and extending the scissors type hinges 28 as necessary to provide clearance between the top of the base 22, i.e., the keyboard, and the bottom of the display screen 24.

Figure 7:
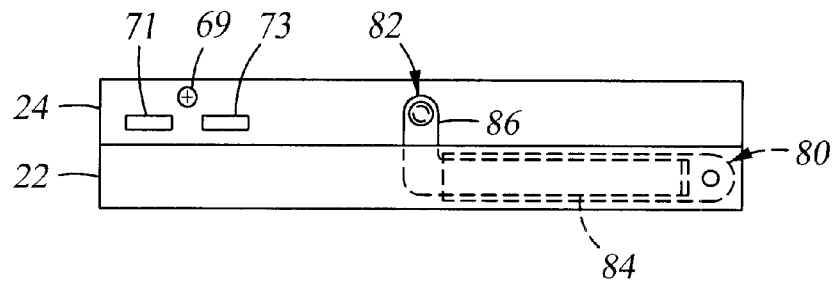
FIG. 7 is a perspective side view of a portable computer having a telescoping hinge shown in a closed, display down position.
Figure 8:
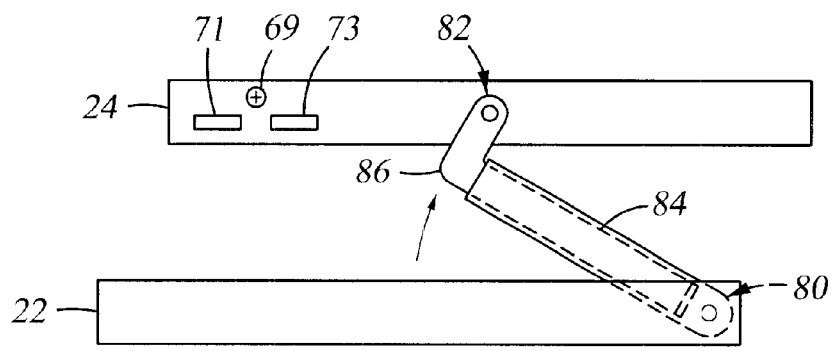
FIG. 8 is a perspective side view of a portable computer showing rotation of a telescoping hinge.
Figure 9:
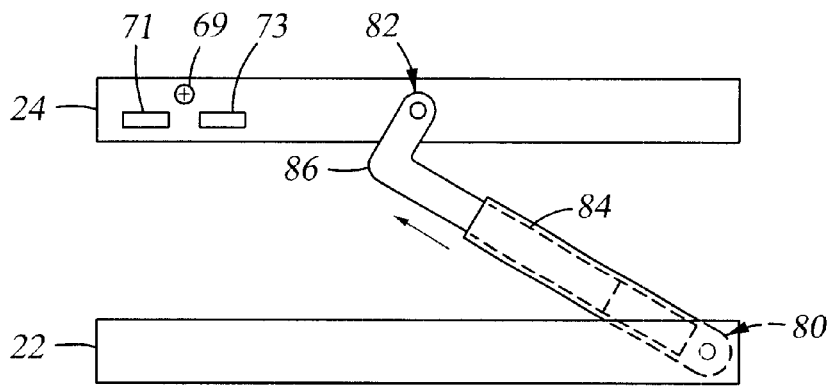
FIG. 9 is a perspective side view of a portable computer showing extension of a telescoping hinge.
Figure 10:
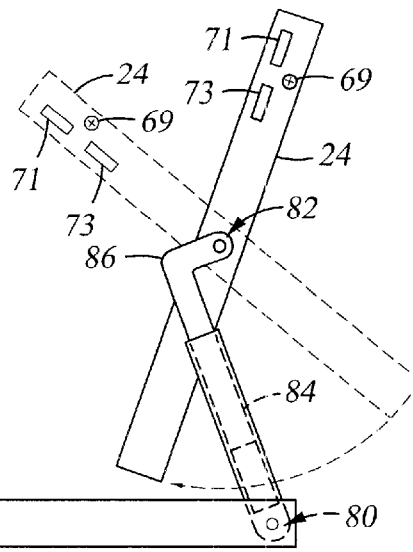
FIG. 10 is a perspective side view of a portable computer showing rotation of a display screen on a telescoping hinge.
Figure 11:
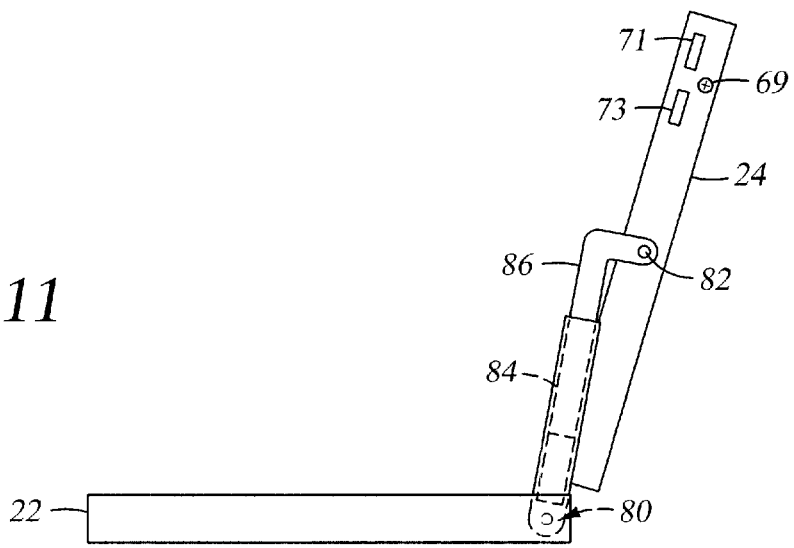
FIG. 11 is a perspective side view of a portable computer showing the display screen in a conventional position for operation.
Figure 12:
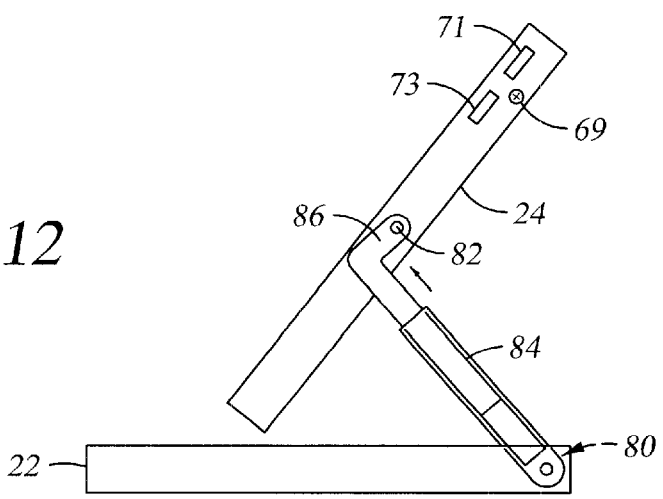
FIG. 12 is a perspective side view of a portable computer showing the display screen in a position above the base.

In another embodiment, the display screen 24 is connected to the base 22 by one or more telescoping hinges 77 as shown in FIGS. 7–12. FIGS. 7–12 are side views showing only one hinging mechanism and its connection. FIG. 7 shows the display screen 24 in a closed facedown position wherein a side mounted telescoping hinge connecting the base 22 and the display screen 24 is fully retracted at the side of the base 22. In a preferred embodiment, a pair of side mounted telescoping hinges connect the base 22 and the display screen 24 on each side. However, both single and multiple telescoping hinge embodiments are contemplated by the invention. The telescoping hinges 77 are rotatably connected on one end to the base 22 and on the other end to the display screen 24 at pivots 80, 82, respectively. The telescoping hinges 77 include at least a first member 84 and a second member 86 which slidably move relative to one another and are held fixed relation under frictional forces, for example. The hinges 77 can rotate about pivot 80 as shown in FIG. 8 to position the display screen 24 both vertically and laterally over the base 22. In addition, the display screen 24 can be extended from the pivot 80 by extending the telescoping hinges as shown in FIG. 9. In a manner similar to the scissors type hinge embodiment, the display screen 24 can rotate about pivot 82, as shown in FIG. 10, to adjust the angle of the display screen 24 relative to the base 22 or to position the display screen 24 in a face-up or face-down position when closed. During operation, the display screen 24 can be positioned towards the back of the base 22 at an angle slightly greater than ninety degrees (90°) as shown in FIG. 11. Additionally, the display screen 24 can be positioned over the base 22 as shown in FIG. 12 by extending the telescoping hinges and altering the angle of the screen relative to the base 22. Conventional electrical connections can be provided between the base 22 and the display screen 24 as described above in relation to the scissors type hinge embodiment.

While the foregoing is directed to the preferred embodiment of the present invention, other and further embodiments of the invention may be devised without departing from the basic scope thereof, and the scope thereof is determined by the claims that follow.

What is claimed is:

1. A portable electronic device, comprising:
   a base having a CPU disposed therein;
   a display screen;
   a first scissors type hinge rotatably connected to the base at a first pivot connection and to the display at a second pivot connection; and
   a second scissors type hinge rotatably connected to the base at a third pivot connection and to the display at a fourth pivot connection; wherein the first and second scissors type hinges rotate parallel to one another and wherein the display screen is allowed to rotate at least 360 degrees about the second and fourth pivot connections.

2. The portable electronic device of claim 1, wherein in a first closed position a viewing area of the display screen and an upper surface of the base face in a common direction and in a second closed position the viewing area and the upper surface of the base face one another.

3. The portable electronic device of claim 1, wherein the first and third pivot connections are at opposite sides of the base and the second and fourth pivot connections are at opposite sides of the display.

4. The portable electronic device of claim 3, wherein in a first closed position the display screen and an upper surface of the base face in a common direction and in a second closed position the display screen and the upper surface of the base face one another.

5. The portable electronic device of claim 1, wherein the first and second scissors type hinges comprise a links assembly.

6. The portable electronic device of claim 1, further comprising a slot formed on each side wall of the base to slidably accommodate the first and third pivot connections.

* * * * *